April 6, 1926.
R. J. AUBUCHONT
CUTTING OR SCORING MACHINE
Filed March 16, 1925
1,579,995
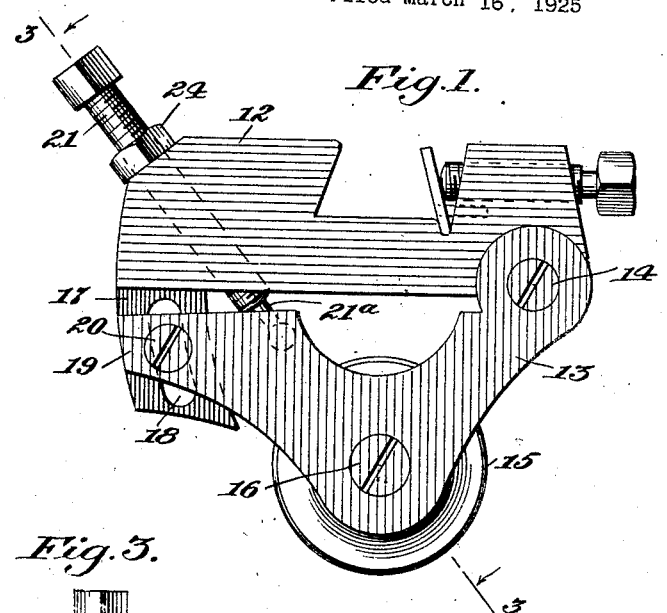
Fig.1.
Fig.2.
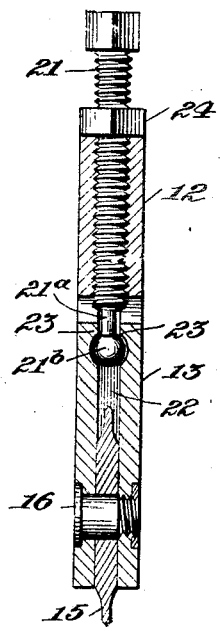
Fig.3.
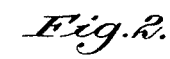
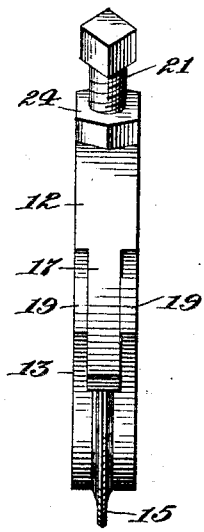
Inventor:
Richard J. Aubuchont,
by Calver & Calver
Attys.

Patented Apr. 6, 1926.

1,579,995

UNITED STATES PATENT OFFICE.

RICHARD J. AUBUCHONT, OF WORCESTER, MASSACHUSETTS.

CUTTING OR SCORING MACHINE.

Application filed March 16, 1925. Serial No. 16,035.

*To all whom it may concern:*

Be it known that I, RICHARD J. AUBUCHONT, a citizen of the Dominion of Canada, residing at Worcester, in the county of Worcester and State of Massachusetts, U. S. A., have invented or discovered certain new and useful Improvements in Cutting or Scoring Machines, of which the following is a specification, reference being had therein to the accompanying drawing.

This invention relates to certain improvements in attachments for machines adapted for use in subdividing card board or the like, or in providing the same with weakened lines on which the card board may be folded. The invention has for its object to provide a conveniently adjustable carrier on which the rotary cutter or scorer is mounted and which has a hinged connection with a clamping block. The invention relates more particularly to means for positively adjusting the carrier for the rotary cutter or scorer either toward or from the work, and to means for securing said carrier in any desirable position of adjustment, as will hereinafter more fully appear.

In the accompanying drawing Fig. 1 is a side view of an improved construction embodying the present invention, Fig. 2 is an end view looking from the left of Fig. 1. Fig. 3 is a section on line 3—3, of Fig. 1.

Referring to the drawing, 12 denotes a clamping block adapted to be adjustably secured to a bar or frame of a cutting or scoring machine, and 13 denotes a carrier arm pivotally connected near one end to the said clamping block by a screw 14. The cutter or scorer wheel 15 is mounted for rotation on a screw 16 at the central portion of the carrier arm 13. Depending from the clamping block 12 is a tenon 17 provided with a slot 18, said tenon being embraced by the forked free end of the carrier 13, this forked end providing two clamping jaws 19 straddling the said tenon 17, so that by virtue of a set screw 20 and the slot 18 in said tenon the pivotally mounted carrier arm 13 may be secured in any desired position of adjustment.

Tapped in the clamping block 13 is a ball-ended adjusting screw 21, the ball at the lower end of said screw fitting in the larger portion of a slot 22 formed in the carrier 13, the slot having a contracted top afforded by inwardly extending lugs 23 which embrace a neck 21$^a$ just above the ball portion 21$^b$ of the said screw. By virtue of this construction the scorer carrier 13 may be positively adjusted either toward or from the work by turning the screw 21, the latter being provided with a set nut 24 by which the said screw 21 may be fixed in any desired position of adjustment.

When the clamping block 13 is to be adjusted the set nut 24 and the set screw 20 will both be loosened, and then by turning the screw 21 any desired adjustment may be effected, after which the clamping screw 20, which has a threaded engagement with one of the clamping jaws 19, will be tightened to secure the scorer carrier 13 in the adjusted position.

From the foregoing it will be understood that the invention provides a simple construction, whereby the rotary cutting and scoring knives of machines employing the same may be positively adjusted either toward or from the work and may be securely fixed in place after such adjustment.

Having thus described my invention I claim and desire to secure by Letters Patent:

A cutting or scoring machine attachment comprising a clamping block having a depending tenon provided with a slot, a carrier pivotally attached to said block near one end and having a forked clamping part near its other end, a set screw passing through said clamping part and said slot, a rotary wheel mounted in said carrier, and a ball-ended adjusting screw tapped in said clamping block, the said carrier being provided with a slot adapted to receive the ball portion of said adjusting screw, said slot having a narrow top portion which embraces a neck above the ball part of said screw.

In testimony whereof I affix my signature.

RICHARD J. AUBUCHONT.